US010263426B2

(12) United States Patent
Yamaguchi et al.

(10) Patent No.: US 10,263,426 B2
(45) Date of Patent: Apr. 16, 2019

(54) SYSTEM STABILIZING CONTROL DEVICE AND METHOD

(71) Applicant: HITACHI, LTD., Tokyo (JP)

(72) Inventors: Ryo Yamaguchi, Tokyo (JP); Kouichi Hara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 176 days.

(21) Appl. No.: 15/518,030

(22) PCT Filed: Oct. 31, 2014

(86) PCT No.: PCT/JP2014/079015
§ 371 (c)(1),
(2) Date: Apr. 10, 2017

(87) PCT Pub. No.: WO2016/067438
PCT Pub. Date: May 6, 2016

(65) Prior Publication Data
US 2017/0310113 A1    Oct. 26, 2017

(51) Int. Cl.
*H02J 3/00* (2006.01)
*H02J 3/38* (2006.01)
(Continued)

(52) U.S. Cl.
CPC ............. *H02J 3/381* (2013.01); *G05B 15/02* (2013.01); *H02J 3/00* (2013.01); *H02J 3/38* (2013.01);
(Continued)

(58) Field of Classification Search
USPC ................ 322/37, 58; 700/292, 295; 702/60
See application file for complete search history.

(56) References Cited

U.S. PATENT DOCUMENTS

| 3,657,728 A | * | 4/1972 | Mitsui | ................. | H02J 3/06 |
| | | | | | 307/20 |
| 6,249,719 B1 | * | 6/2001 | Vu | ................. | H02J 3/00 |
| | | | | | 700/286 |

(Continued)

FOREIGN PATENT DOCUMENTS

| JP | 09-046908 A | 2/1997 |
| JP | 09-074679 A | 3/1997 |
| JP | 2000-092714 A | 3/2000 |

OTHER PUBLICATIONS

International Search Report, PCT/JP2014/079015, dated Jan. 27, 2015, 1 pg.

*Primary Examiner* — Pedro J Cuevas
(74) *Attorney, Agent, or Firm* — Volpe and Koenig, P.C.

(57) ABSTRACT

A system stabilizing controller for estimating and controlling stability of a power grid includes a collection unit collecting grid information including a power flow amount from the power grid and a calculation unit calculating a generator shedding amount at a fault observation point on the basis of the grid information and estimating a correlation line on the basis of the power flow amount and generator shedding amount. The calculation unit determines a generator phase angle curve that is the relationship between the internal generator phase angle of a generator connected to the power grid and the power flow amount, determines a stability limit power flow amount on the basis of the amounts of generator acceleration energy and deceleration energy in the generator phase angle curve, determines a stability limit generator shedding amount corresponding to the stability limit power flow amount, and estimates a correlation line including a stability limit point.

10 Claims, 8 Drawing Sheets

(51) Int. Cl.
*H02J 3/46* (2006.01)
*G05B 15/02* (2006.01)

(52) U.S. Cl.
CPC .......... *H02J 3/46* (2013.01); *H02J 2003/003* (2013.01); *H02J 2003/007* (2013.01)

(56) References Cited

U.S. PATENT DOCUMENTS

| | | | | |
|---|---|---|---|---|
| 6,690,175 B2* | 2/2004 | Pinzon | ...................... | H02J 3/24 324/522 |
| 7,136,725 B1* | 11/2006 | Paciorek | .................. | H02J 3/14 700/295 |
| 7,149,605 B2* | 12/2006 | Chassin | .................... | H02J 3/14 700/295 |
| 7,356,422 B2* | 4/2008 | Schweitzer, III | ......... | H02J 3/14 702/57 |
| 7,398,194 B2* | 7/2008 | Evans | ................ | G06F 17/5036 700/286 |
| 7,508,224 B2* | 3/2009 | Williams | ............... | G01R 27/32 307/102 |
| 7,603,203 B2* | 10/2009 | Zhang | ................... | H02J 3/14 700/292 |
| 7,656,140 B2* | 2/2010 | Marino | ................ | H02M 3/157 323/282 |
| 7,996,116 B2* | 8/2011 | Wiszniewski | ............ | H02J 3/24 307/31 |
| 8,606,422 B2* | 12/2013 | Sun | .......................... | H02J 3/14 700/292 |
| 8,942,856 B2* | 1/2015 | Ren | .......................... | H02J 3/18 700/297 |
| 9,013,067 B2* | 4/2015 | Kuehn | ..................... | H02J 3/24 307/102 |
| 9,647,495 B2* | 5/2017 | Bonicatto | ................. | H02J 3/14 |
| 9,971,371 B2* | 5/2018 | Sun | .......................... | G05F 1/625 |
| 10,033,318 B2* | 7/2018 | Valdivia Guerrero | ....................... | H02M 7/797 |
| 2004/0010350 A1* | 1/2004 | Lof | .......................... | H02J 3/24 700/292 |
| 2008/0077368 A1* | 3/2008 | Nasle | ..................... | G05B 17/02 703/4 |
| 2008/0122414 A1* | 5/2008 | Solyom | .................... | G05F 1/14 323/247 |
| 2009/0001940 A1* | 1/2009 | Sihler | ..................... | H02J 3/24 322/58 |
| 2009/0009349 A1* | 1/2009 | Wiszniewski | ............ | H02J 3/24 340/635 |
| 2012/0112713 A1* | 5/2012 | Kuehn | ..................... | H02J 3/24 323/207 |
| 2012/0123602 A1* | 5/2012 | Sun | .......................... | H02J 3/14 700/292 |
| 2012/0277929 A1* | 11/2012 | Wiszniewski | ............ | H02J 3/14 700/295 |
| 2013/0166090 A1* | 6/2013 | Ren | .......................... | H02J 3/18 700/297 |
| 2015/0088439 A1* | 3/2015 | Coffrin | ................... | H02J 3/005 702/60 |
| 2016/0274606 A1* | 9/2016 | Sun | .......................... | G06N 5/02 |
| 2017/0353033 A1* | 12/2017 | Kuroda | ..................... | H02J 3/24 |

* cited by examiner

SYSTEM STABILIZING CONTROL DEVICE AND METHOD

TECHNICAL FIELD

The present invention relates to maintenance of transient stability of a power grid and a method of maintaining stability of a grid by instantaneously performing generator shedding upon occurrence of a power transmission line fault and the like on the basis of precalculated stability information for assumed fault cases and, particularly, to a system stabilizing controller which estimates an appropriate generator shedding amount in a case where a precalculation cannot be performed due to a fault or the like.

BACKGROUND ART

A system stabilizing controller precalculates generator shedding information for assumed fault cases at constant intervals using online data of grid information and, when a fault occurs in the grid, performs generator shedding of an appropriate generator using precalculated information before a group of generators in the grid oscillates or steps out under the influence of the fault. On the other hand, even when a precalculation cannot be performed due to a fault of the system stabilizing controller or the like, generator shedding information suitable for a present grid state must be calculated so that a shortage in a generator shedding amount does not occur.

As conventional art, PTL 1 reports a method of estimating generator shedding information suitable for a present grid state using history data of previously calculated generator shedding information. Specifically, every time generator shedding information is precalculated at constant intervals by a system stabilizing controller, a data pair constituted by a power flow amount and a generator shedding amount at each fault observation point is accumulated as two-dimensional generator shedding amount data. A correlation line representing a relationship between the power flow amount and the generator shedding amount at each fault observation point is estimated in advance from history data of the generator shedding amount and, when a grid fault is detected, a necessary generator shedding amount is instantaneously determined from a relationship between a present cross-sectional power flow and the correlation line and generator shedding is performed by a combination with a generator with a smallest generator shedding amount exceeding the necessary generator shedding amount.

CITATION LIST

Patent Literature

[PTL 1]
Japanese Patent Publication No. H9-074679

SUMMARY OF INVENTION

Technical Problem

In the conventional art described above, as the correlation line, a correlation line between a power flow amount and a generator shedding amount at a fault observation point is calculated by two-dimensionally plotting data pairs of a power flow amount and a generator shedding amount at fault observation points which are accumulated as history data, dividing generator shedding amount data by increments of a generator shedding amount set in advance and determining a representative point of generator shedding amount data for each section, and applying a least-squares method to the group of representative points. However, with respect to specific fault observation points, there is a possibility that a case may occur in which the group of two-dimensional plot points representing data pairs of a power flow amount and a generator shedding amount which are history data becomes locally concentrated and only one representative point can be calculated with respect to all sections of the generator shedding amount. In this case, since a correlation line is forcibly estimated using only one representative point, a slope of the correlation line is fixed at a setting value and only an intercept passing through the representative point is determined. As a result, estimation accuracy of the correlation line is significantly degraded. Therefore, generator shedding information suitable for a present grid cannot be calculated and a shortage in a generator shedding amount may occur. In order to calculate a correlation line in a stable manner, at least two representative points are required.

In other words, there is a problem in that, a local concentration of sample points when estimating a correlation line representing a relationship between a power flow amount and a generator shedding amount at a fault observation point using history data of generator shedding information causes estimation accuracy of the correlation line to be significantly degraded.

Solution to Problem

In order to solve the problem described above, the present invention provides a system stabilizing controller for estimating and controlling stability of a power grid, the system stabilizing controller including: a collection unit configured to collect grid information including a power flow amount from the power grid; and a calculation unit configured to calculate a generator shedding amount at a fault observation point on the basis of the grid information and estimate a correlation line on the basis of the power flow amount and the generator shedding amount, wherein the calculation unit is configured to determine, on the basis of the correlation line, a generator phase angle curve that is a relationship between an internal generator phase angle of a generator connected to the power grid and the power flow amount, determine a stability limit power flow amount on the basis of amounts of acceleration energy and deceleration energy of the generator in the generator phase angle curve, determine a stability limit generator shedding amount corresponding to the stability limit power flow amount, and estimate the correlation line including a stability limit point constituted by the stability limit generator shedding amount and the stability limit power flow amount.

Advantageous Effects of Invention

According to the present invention, even in a case where sample points of generator shedding selection information locally concentrate and estimation accuracy of a correlation line representing a relationship between a power flow amount and a generator shedding amount at a fault observation point becomes significantly degraded, since the estimation accuracy of the correlation line can be maintained as long as no major changes are made to grid configuration, calculation of a generator shedding amount suitable for a grid state can be realized.

DESCRIPTION OF EMBODIMENTS

Hereinafter, an embodiment of the present invention will be described in detail with reference to the drawings.

Figure 1:
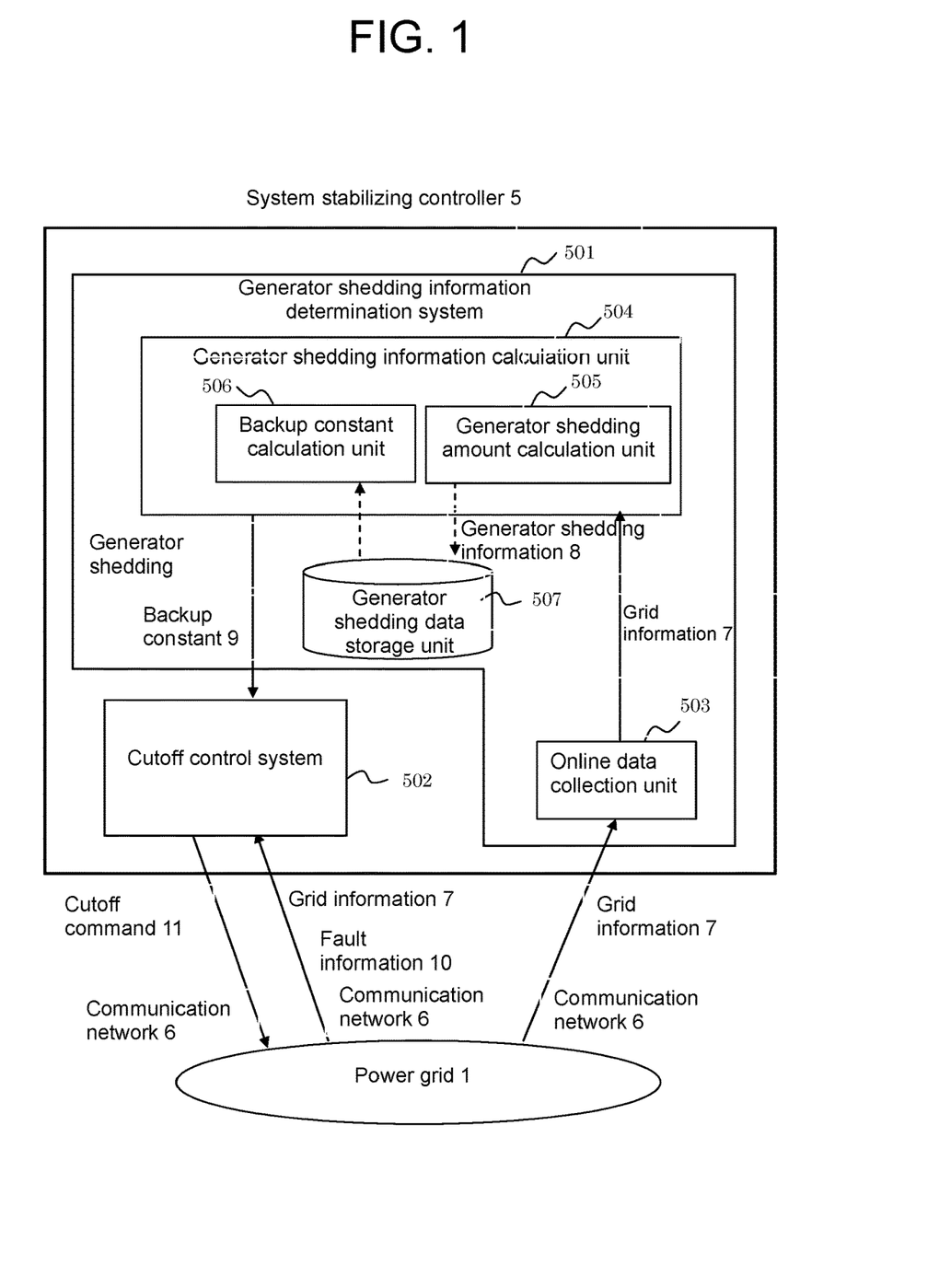
FIG. 1 is a functional block diagram of a system stabilizing controller to which the present invention is applied.
Figure 2:
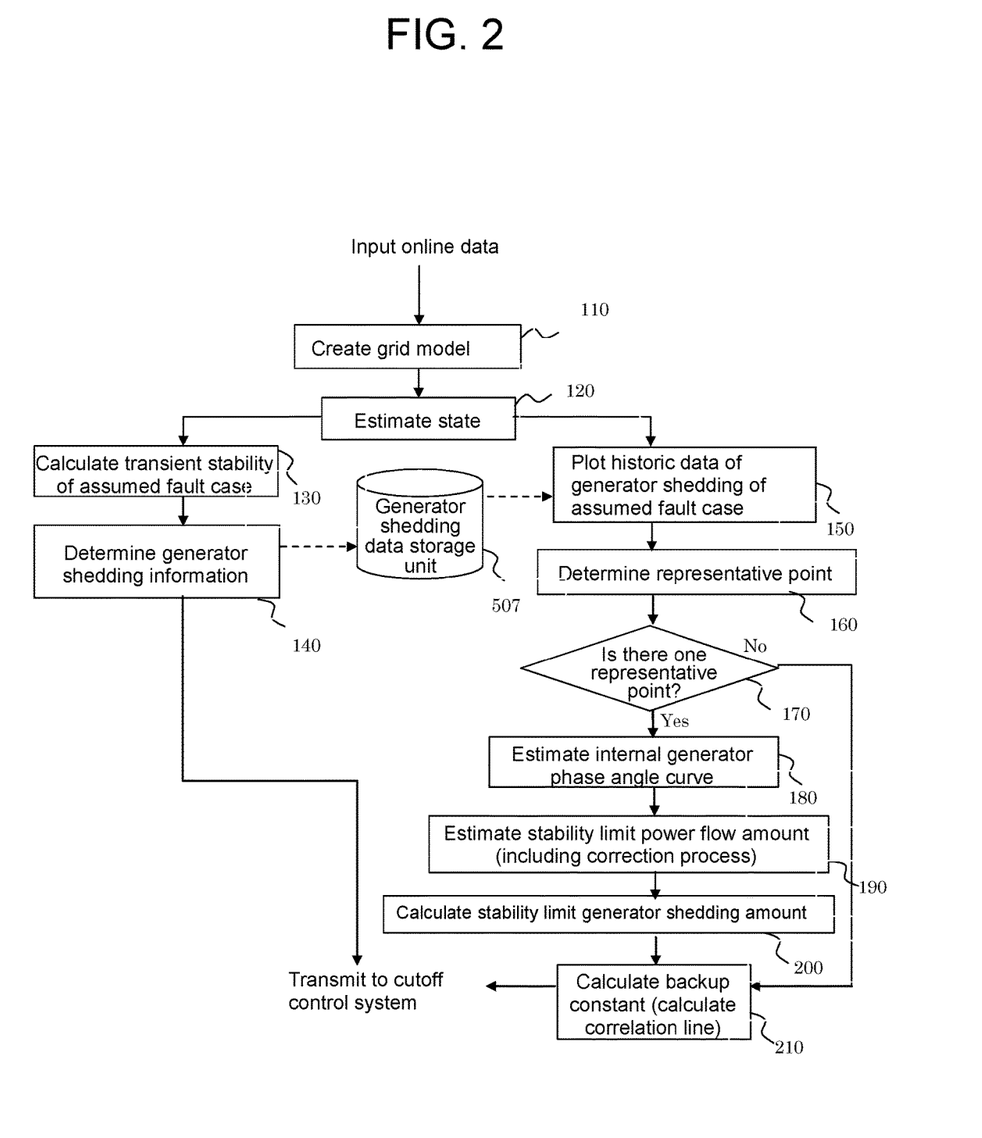
FIG. 2 is a diagram showing a processing flow of a generator shedding information determination system in a system stabilizing controller to which the present invention is applied in a case where a generator shedding amount calculation unit and a backup constant calculation unit simultaneously perform parallel calculations.

FIG. 1 is a functional block diagram of a system stabilizing controller to which the present invention is applied, and FIG. 2 shows a processing flow of a generator shedding information determination system.

A system stabilizing controller 5 is constituted by a generator shedding information determination system 501 and a cutoff control system 502. Moreover, these grids are configured to include a processor such as a CPU which performs calculation processes and a storage medium such as a hard disk which performs data storage. In this case, the generator shedding information determination system 501 is constituted by an online data collection unit 503, a generator shedding information calculation unit 504, and a generator shedding data storage unit 507.

The online data collection unit 503 periodically retrieves TM data (effective/reactive power and effective/reactive terminal voltage of a generator, effective/reactive power of a power transmission line or a transformer, and the like) which is grid operation information of a power grid and SV data (information indicating whether a relay operation or a breaker is switched on or off, and the like) as grid information 7 from a power grid 1 via a communication network 6, creates a grid model and estimates a state using the grid information 7 (steps 110 and 120), and transmits results thereof to the generator shedding information calculation unit 504.

The generator shedding information calculation unit 504 is constituted by a generator shedding amount calculation unit 505 and a backup constant calculation unit 506.

The generator shedding amount calculation unit 505 performs a detailed transient stability calculation for each fault observation point using the grid information 7 at constant intervals (step 130), and determines generator shedding information 8 which is a precalculation result (step 140). The generator shedding information 8 is transmitted to the cutoff control system 502. In addition, the generator shedding information 8 (including information on a generator phase angle curve) is transmitted to the generator shedding data storage unit 507 to be accumulated as history data.

As a backup function of the generator shedding amount calculation unit 505, the backup constant calculation unit 506 calculates a correlation line 12 representing a relationship between a power flow amount and a generator shedding amount at each fault observation point using the grid information 7 and the generator shedding information 8 which is history data, and transmits information on a slope and an intercept which are information on the correlation line 12 to the cutoff control system 502 as a backup constant 9. In a specific processing flow, first, data pairs of a power flow amount and a generator shedding amount of fault observation points which represent the history of the generator shedding information 8 are two-dimensionally plotted (step 150), and a representative point is determined for each set increment of a generator shedding amount (step 160).

Figure 4:
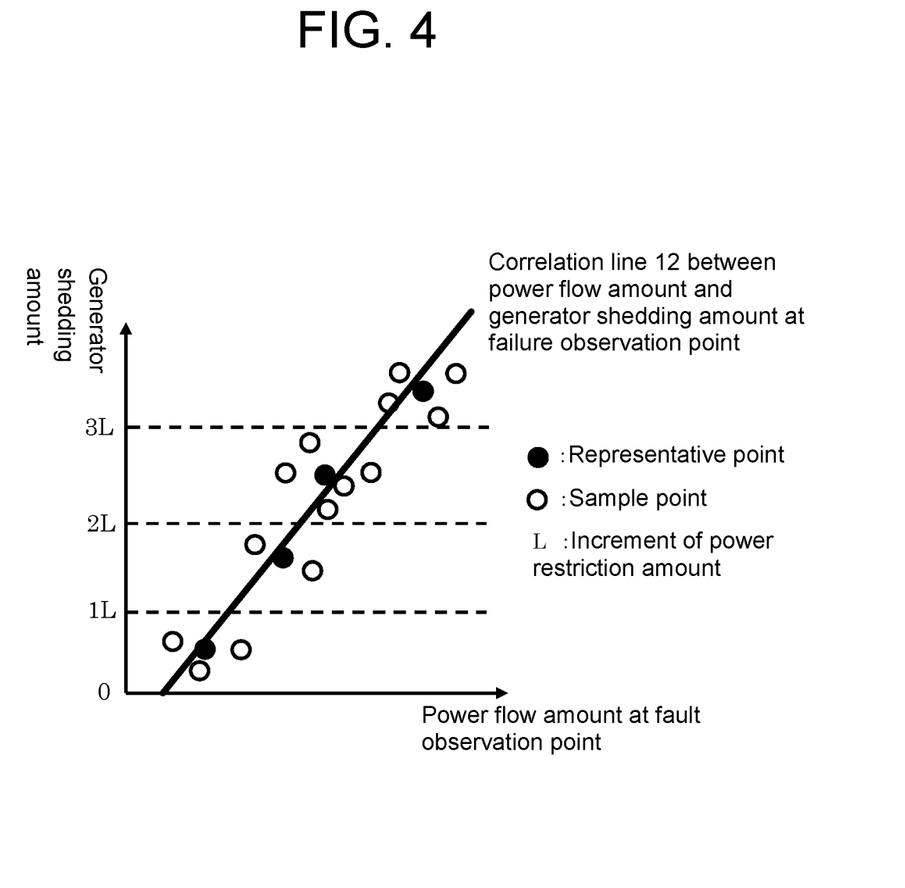
FIG. 4 is a schematic view of estimation of a correlation line using a history of generator shedding amount data.

In this case, a conditional branch is provided with respect to the number of representative points (step 170). When there are two or more representative points, a least-squares method is applied to the group of representative points to determine a correlation line. FIG. 4 shows an example of estimation of the correlation line 12 when there are two or more representative points. In the diagram, since four representative points are determined, the least-squares method can be applied. On the other hand, when there is only one representative point, since the correlation line 12 cannot be determined by the least-squares method, the correlation line 12 is estimated using a stability limit point.

Figure 5:
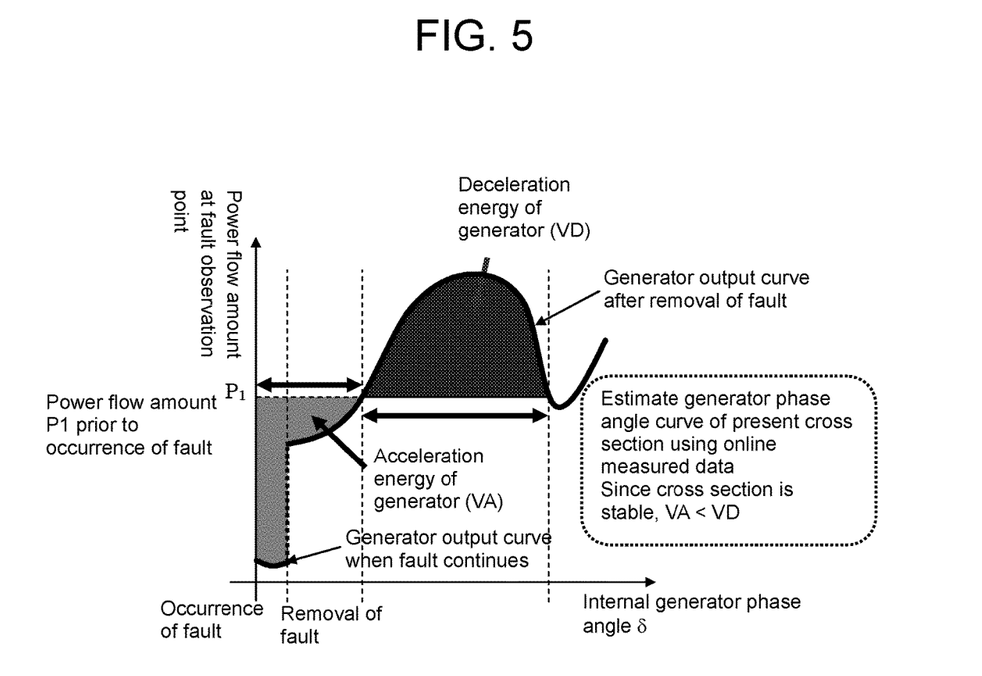
FIG. 5 is a diagram showing an example of a generator phase angle curve calculated from online grid data.

First, a generator phase angle curve of a present cross section is estimated using the grid information 7 which is online data (step 180). FIG. 5 shows an example of a generator phase angle curve of a present cross section. Since the cross section is a stable cross section, when determining stability with a power flow amount P1 prior to an occurrence of an fault as a reference, a relationship expressed as "acceleration energy of generator<deceleration energy of generator" is satisfied.

In this case, a generator phase angle curve refers to a trajectory of a generator output curve after an occurrence of a grid fault at a fault observation point and represents a relationship between an internal generator phase angle and a power flow amount at the fault observation point. When the trajectory is lower than power flow amount output before the occurrence of the fault, an enclosed area is referred to as acceleration energy of a generator since the generator accelerates, but when the trajectory is higher, an enclosed area is referred to as deceleration energy of the generator since the generator decelerates. By comparing the acceleration energy and the deceleration energy with each other, transient stability at a fault observation point of a power transmission line can be evaluated. Since a cross section on which a grid fault has not been detected is in a stable state, a relationship expressed as "acceleration energy of generator<deceleration energy of generator" is satisfied.

Figure 6:
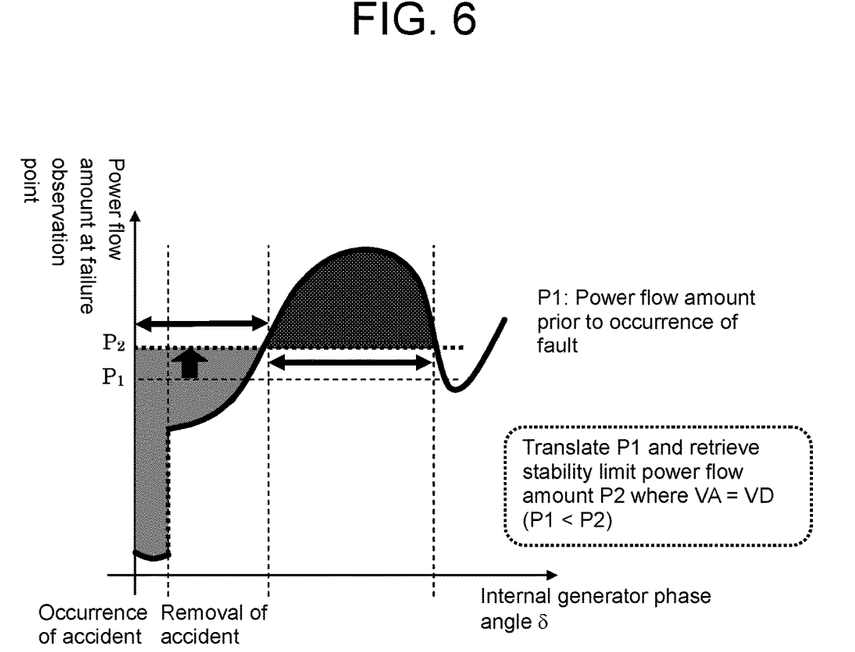
FIG. 6 is a schematic view of estimation of a stability limit power flow amount.

Next, a stability limit power flow amount (step 190) is estimated using a generator phase angle curve. FIG. 6 is a schematic view of estimation of a stability limit power flow amount. Stability is determined while changing a power flow amount P1 prior to an occurrence of a fault, and a power flow amount where "acceleration energy of generator=deceleration energy of generator" is satisfied is denoted as a stability limit power flow amount P2. In addition, a generator phase angle curve having a power flow amount prior to an occurrence of an fault closest to P2 is selected from the history of generator phase angle curves accumulated in the generator shedding data storage unit 507, and a curve coefficient of the generator phase angle curve of the present cross section is corrected using the selected curve. Stability is determined while changing P2 on the generator phase angle curve after the correction, and P2 where "acceleration energy of generator=deceleration energy of generator" is satisfied is re-estimated.

Strictly speaking, this process is performed because, when the power flow amount at a fault observation point is changed, the generator phase angle curve itself also changes slightly, and when state stability is evaluated by changing the power flow amount prior to an occurrence of an fault with a simple translation with respect to the internal generator phase angle, estimation accuracy of the stability limit power flow amount is degraded. Therefore, in order to improve the estimation accuracy of the stability limit power flow amount, a process of correcting a generator phase angle curve representing a changed power flow amount prior to an occurrence of a fault using a generator phase angle curve in history data is introduced. In addition, since the generator phase angle curve after the correction satisfies "acceleration energy of generator≠deceleration energy of generator", the stability limit power flow amount satisfying "acceleration energy of generator=deceleration energy of generator" is recalculated. Since this correction process enables the generator phase angle curve representing a changed power flow at a fault observation point to be more accurately reproduced, the estimation accuracy of the stability limit power flow amount is improved.

Figure 7:
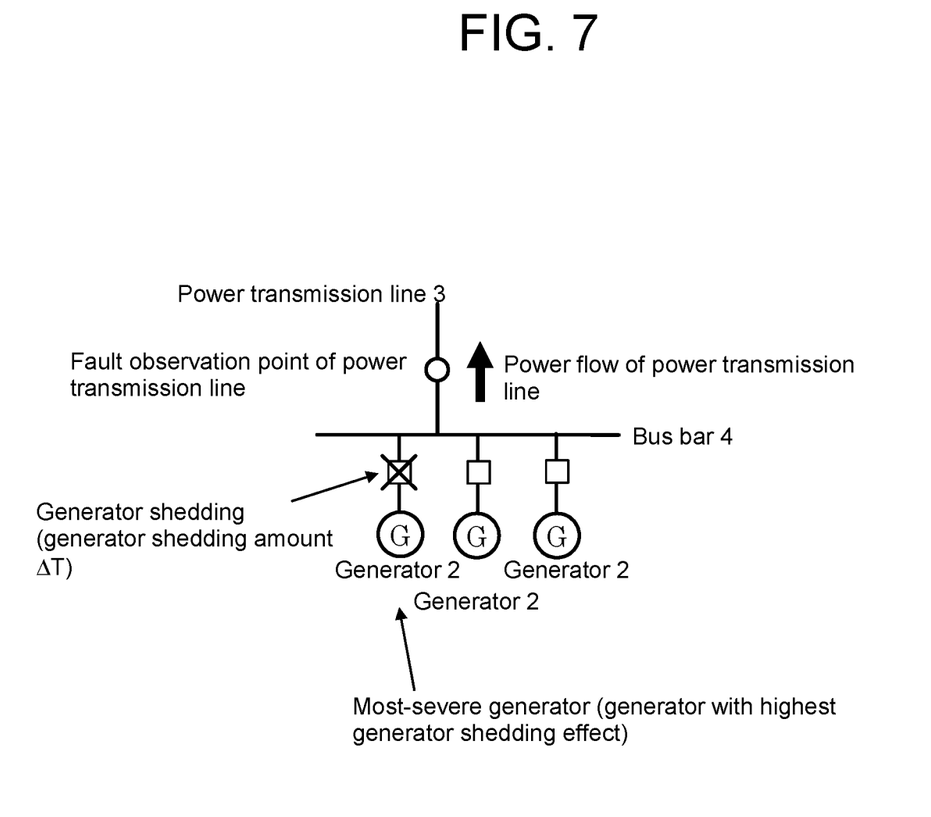
FIG. 7 is a schematic view of estimation of a stability limit generator shedding amount.

In addition, as a generator shedding amount at a fault observation point corresponding to a deviation $\Delta P (=P2-P1)$ of the stability limit power flow amount, as shown in FIG. 7, a generator shedding amount of a most-severe generator with a highest generator shedding effect in the group of generators at the fault observation point is determined as a stability limit generator shedding amount $\Delta T$ (step 200).

As described earlier, the stability limit generator shedding amount is a value corresponding to the stability limit power flow amount, and the most-severe generator is selected and an output amount thereof is adopted as the stability limit generator shedding amount. This is based on the thinking that the function of the present invention is considered a backup function and that a shortage in the generator shedding amount must be avoided without fail and a certain amount of excessive generator shedding is allowed. Therefore, only a most-severe generator with a highest generator shedding effect is set as a generator shedding object. In this case, the most-severe generator can be determined from generator shedding information accumulated in the system stabilizing controller.

Figure 8:
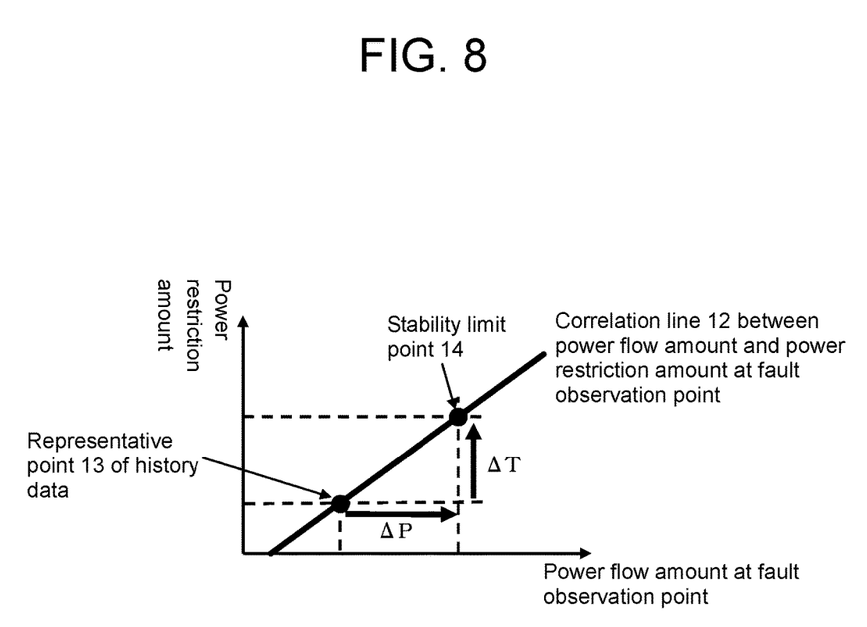
FIG. 8 is a schematic view of estimation of a correlation line according to the present invention.

Finally, as shown in FIG. 8, a stability limit point 14 is determined using $\Delta P$ and $\Delta T$ which represent displacements from a representative point 13 in the history data.

In this case, when a group of two-dimensional plot points representing data pairs of a power flow amount and a generator shedding amount which are history data becomes locally concentrated and only one representative point can be calculated with respect to all sections of the generator shedding amount, the stability limit point represents a deviation from the representative point and the deviation is to be determined using a stability limit power flow amount and a stability limit generator shedding amount.

The correlation line 12 passing through the representative point 13 in the history data and the stability limit point 14 is calculated (step 210), and the backup constant 9 which is information on the correlation line 12 is transmitted to the cutoff control system 502.

As described above, in the present invention, every time generator shedding information is precalculated at constant intervals by the system stabilizing controller, a data pair constituted by a power flow amount and a generator shedding amount at each fault observation point is accumulated as two-dimensional generator shedding amount data and, at the same time, information on a generator phase angle curve is also accumulated as history data, and a stability limit point is estimated from a generator phase angle curve of a present cross section and a generator phase angle curve in history data.

Figure 3:
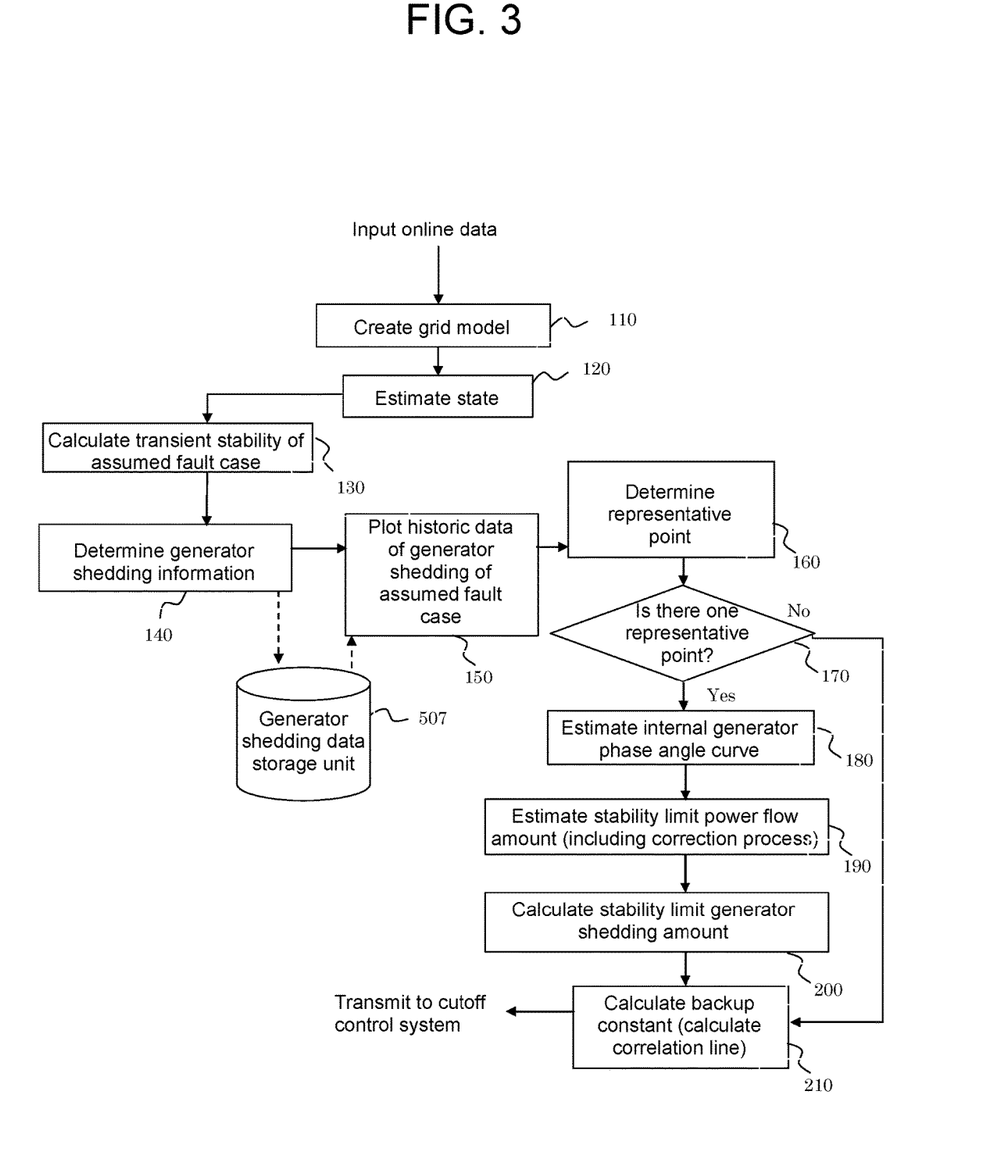
FIG. 3 is a diagram showing a processing flow of a generator shedding information determination system in a system stabilizing controller to which the present invention is applied in a case where a generator shedding amount calculation unit and a backup constant calculation unit sequentially perform calculations.

In this case, as a processing flow by the generator shedding information calculation unit 504, both a method of simultaneously performing parallel calculations of the generator shedding amount calculation unit 505 and the backup constant calculation unit 506 (FIG. 2) and a method of sequentially performing calculations of the generator shedding amount calculation unit 505 and the backup constant calculation unit 506 (FIG. 3) are conceivable. In the method of simultaneously performing parallel calculations (FIG. 2), calculation intervals of the generator shedding amount calculation unit 505 and the backup constant calculation unit 506 need not necessarily be the same and can be changed in accordance with the numbers of analysis engines devoted to the generator shedding amount calculation unit 505 and the backup constant calculation unit 506 or the like.

When receiving fault information 10 of the power grid, the cutoff control system 502 performs generator shedding by instantaneously transmitting a cutoff command 11 to an appropriate generator on the basis of the grid information 7 from the online data collection unit 503, the generator shedding information 8 from the generator shedding information calculation unit 504, and the backup constant 9. When operation of the generator shedding amount calculation unit 505 is normal, generator shedding is performed using the generator shedding information 508. However, when the generator shedding amount calculation unit 505 is unable to perform precalculations due to some fault, generator shedding is performed using the backup constant 9.

As described above, in the present invention, when only one representative point can be calculated with respect to all sections of a generator shedding amount, a generator phase angle curve at a present cross section is calculated from grid information retrieved at constant intervals, a stability limit point is estimated from the generator phase angle curve, and a correlation line is determined from the two points, namely, the stability limit point and the representative point.

REFERENCE SIGNS LIST

1 Power grid
2 Generator
3 Power transmission line
4 Bus bar
5 system stabilizing controller
6 Communication network
7 Grid information
8 Generator shedding information
9 Backup constant
10 Fault information
11 Cutoff command
12 Correlation line
13 Representative point of history data
14 Stability limit point
501 Generator shedding information determination system
502 Cutoff control system
503 Online data collection unit
504 Generator shedding information calculation unit 505 Generator shedding amount calculation unit
506 Backup constant calculation unit
507 Generator shedding data storage unit

The invention claimed is:

1. A system stabilizing control device for estimating and controlling stability of a power grid, the system stabilizing control device comprising:
a collection unit configured to collect grid information including a power flow amount from the power grid; and
a calculation unit configured to calculate a generator shedding amount at a fault observation point on the basis of the grid information and estimate a correlation line on the basis of the power flow amount and the generator shedding amount, wherein
the calculation unit is configured to:
determine a power phase difference angle curve that is a relationship between an internal generator phase difference angle of a generator connected to the power grid and the power flow amount;
determine a stability limit power flow amount on the basis of amounts of acceleration energy and deceleration energy of the in the power phase difference angle curve;
determine a stability limit generator shedding amount corresponding to the stability limit power flow amount; and estimate the correlation line including a stability limit point constituted by the stability limit generator shedding amount and the stability limit power flow amount.

2. The system stabilizing control device according to claim 1, further comprising a storage unit configured to store generator shedding information including history information of the generator phase difference angle curve, wherein
the calculation unit is configured to
select a second generator phase difference angle curve with a power flow amount closest to the stability limit power flow amount from the storage unit and correct a curve coefficient of the generator phase difference angle curve using the second generator phase difference angle curve.

3. The system stabilizing control device according to claim 2, wherein
the calculation unit is configured to
determine a stability limit point constituted by the stability limit power flow amount and the stability limit generator shedding amount from the generator phase difference angle curve after the correction and estimate the correlation line including the stability limit point.

4. The system stabilizing controller according to claim 2, wherein the calculation unit is configured to
determine the stability limit generator shedding amount by selecting a generator with a high generator shedding effect on the basis of generator shedding information accumulated in the storage unit.

5. The system stabilizing control device according to claim 1, wherein
the calculation unit is configured to determine amounts of acceleration energy and deceleration energy of the generator on the basis of a power flow amount prior to an occurrence of a grid fault and determine the stability limit power flow amount.

6. The system stabilizing controller according to claim 1, wherein the calculation unit is configured to determine one or a plurality of pieces of data of the generator shedding amount with respect to the power flow amount on the basis of a representative point for each prescribed section.

7. The system stabilizing controller according to claim 6, wherein the correlation line is estimated by a least-squares method of the representative point.

8. The system stabilizing control device according to claim 1, further comprising a cutoff control system configured to transmit a cutoff command to the generator on the basis of the grid information and constant information of a slope and an intercept of the correlation line.

9. A system stabilizing control method of estimating and controlling stability of a power grid, the system stabilizing control method comprising: determining a generator phase difference angle curve that is a relationship between an internal generator phase difference angle of a generator connected to the power grid and a power flow amount of the power grid; determining a stability limit power flow amount on the basis of amounts of acceleration energy and deceleration energy of the generator in the generator phase difference angle curve; determining a stability limit generator shedding amount corresponding to the stability limit power flow amount; and estimating a correlation line including a stability limit point constituted by the stability limit generator shedding amount and the stability limit power flow amount.

10. The system stabilizing control method according to claim 9, further comprising selecting a second generator phase angle curve with a power flow amount closest to the stability limit power flow amount from history information of the generator phase angle curve, and correcting a curve coefficient of the generator phase angle curve using the second generator phase angle curve.

* * * * *